US005714248A

United States Patent [19]

Lewis

[11] Patent Number: 5,714,248

[45] Date of Patent: Feb. 3, 1998

[54] ELECTROSTATIC IMAGING MEMBER FOR CONTACT CHARGING AND IMAGING PROCESSES THEREOF

[75] Inventor: Richard B. Lewis, Williamson, N.Y.

[73] Assignee: Xerox Corporation, Stamford, Conn.

[21] Appl. No.: 695,928

[22] Filed: Aug. 12, 1996

[51] Int. Cl.[6] ........ B32B 18/00

[52] U.S. Cl. ........ 428/325; 428/331; 428/702; 428/329; 428/336; 399/174; 430/58; 430/67; 430/65; 430/63

[58] Field of Search ........ 430/63, 62, 56, 430/66, 65, 67, 58; 428/702, 331, 329, 325, 306; 394/174

[56] References Cited

U.S. PATENT DOCUMENTS

| | | | |
|---|---|---|---|
| 3,121,006 | 2/1964 | Middleton et al. | 96/1 |
| 3,407,064 | 10/1968 | Bach et al. | 96/1.8 |
| 4,150,986 | 4/1979 | Takahata et al. | 96/1.5 R |
| 4,280,918 | 7/1981 | Homola et al. | 252/62.51 |
| 4,515,882 | 5/1985 | Mammimo et al. | 430/58 |
| 4,565,765 | 1/1986 | Knapp et al. | 430/122 |
| 4,654,284 | 3/1987 | Yu et al. | 430/59 |
| 4,710,441 | 12/1987 | Ritchie et al. | 430/62 |
| 4,737,429 | 4/1988 | Mort et al. | 430/58 |
| 5,008,172 | 4/1991 | Rokutanzono et al. | 430/67 |
| 5,039,559 | 8/1991 | Sang et al. | 427/213.3 |
| 5,051,328 | 9/1991 | Andrews et al. | 430/56 |
| 5,063,128 | 11/1991 | Yuh et al. | 430/63 |
| 5,110,774 | 5/1992 | Ogura | 501/126 |
| 5,128,091 | 7/1992 | Agur et al. | 264/512 |
| 5,244,760 | 9/1993 | Nealey et al. | 430/58 |
| 5,300,391 | 4/1994 | Fabian et al. | 430/127 |
| 5,382,486 | 1/1995 | Yu et al. | 430/56 |
| 5,508,135 | 4/1996 | Lelantal et al. | 430/63 |

OTHER PUBLICATIONS

European Patent Application; Shintetsu Go et al.; Publication No. 0 609 511 A1; Published Aug. 10, 1994; "Electrophotographic Photosensitive Member and Electrophotographic Apparatus Employing The Same".

*Primary Examiner*—George F. Lesmes
*Assistant Examiner*—Steven H. Versteeg

[57] ABSTRACT

An imaging member comprised of a supporting substrate with a coating thereover and wherein the coating is comprised of resin, electrically conductive metal oxide particles, and insulative metal oxide particles, wherein each electrically conductive particle is substantially electrically isolated and separated from any other of the electrically conductive particles by the insulative particles.

26 Claims, No Drawings

ELECTROSTATIC IMAGING MEMBER FOR CONTACT CHARGING AND IMAGING PROCESSES THEREOF

REFERENCE TO ISSUED PATENTS

Attention is directed to commonly owned and assigned U.S. Pat. Nos.: U.S. Pat. No. 5,424,129 to Lewis et al., issued Jun. 13, 1995, entitled "Composite Metal Oxide Particle Processes and Toners Thereof", which discloses a composite metal oxide charge enhancing additive composition comprised of a first metal oxide forming a core particle, and a second metal oxide forming an outer layer on the first metal oxide core, wherein the composite particle can be optionally treated with, for example, an organosilane compound to form a covalently bonded surface layer thereon; and 5,013,624, to Yu, issued May 7, 1991, entitled "Glassy Metal Oxide Layers for Photoreceptor Applications", which discloses an electrophotographic imaging member having a metal oxide hole blocking layer in the form of a film of an inorganic glassy network, wherein the metal oxide layer may be bonded to a conductive layer of the imaging member.

The disclosures of each the above mentioned patents are incorporated herein by reference in their entirety.

BACKGROUND OF THE INVENTION

The present invention is generally directed to an electrostatic imaging member suitable for contact charging applications in, for example, photoreceptors and electroreceptors. More specifically, the present invention is directed to an imaging member comprised of a substrate with a charge-accepting coating thereover comprised of an electrically insulating continuous phase containing isolated or discrete electrically conductive patches or islands which are partially or substantially accessible to contact charging with, for example, an electrically biased contact charging member. In embodiments, the imaging member can be comprised of an insulating binder resin, electrically conductive metal oxide particles, and electrically insulating metal oxide particles, wherein the electrically conductive particles are substantially isolated and separated from like electrically conductive particles by the insulative particles and or resin to provide conductive patches or islands at the surface and within an insulating matrix which matrix is comprised of, for example, resin and or insulative particles.

Image generation by electrostatic means ordinarily employs non-contact corona charging either to charge a photoreceptor or to write directly onto an electroreceptor. Corona charging induces localized air breakdown to generate ions, which move to the imaging member by imposed fields. Non-contact corona methods require high voltages, for example, on the order of about 7 kilovolts, and a relatively costly power supply. Corona charging apparatus is susceptible to failure modes, such as by dirt accumulation, and generates effluents such as ozone and oxides of nitrogen. Charging by direct contact with a conformable, conductive member can be accomplished by providing between the conductive member and the imaging member a thin film of water, alcohol, or like liquid, reference for example, U.S. Pat. No. 2,987,660 to Walkup, or by providing carefully tailored, superimposed, alternating voltages to the charging member, reference for example, U.S. Pat. No. 5,126,913 to Araya et al. However, liquid-film contact charging systems are also disadvantaged by failure modes, including evaporation and image defects arising from short circuiting caused by pinholes in the imaging member or, in the case of an electroreceptor, between adjacent writing styli. Alternating voltage systems are complex, costly, limited to relatively low process speeds, and have a limited operational life apparently attributable to imaging member degradation or erosion by electrical breakdown products. Attempts to simply directly contact charge, without the use of liquids or superposed alternating voltages, have been observed to lead to non-uniform and contact pressure sensitive charge patterns on ordinary photoreceptors and electroreceptors.

Although not wanting to be limited by theory, it is believed that the imaging members prepared in accordance with the present invention are capable of being operated in a contact charging mode without experiencing the aforementioned defects primarily since the isolated electrically conductive patches on the surface of the imaging member are readily contacted by and accept charge from the contact charging member, and the electrical isolation of the conductive particles or patches prevents lateral spreading of latent image charges.

The following patents are of interest:

European Patent Publication EP 0 609 511 A1, filed Nov. 30, 1993, discloses an electrophotographic photosensitive member including, in order, a supporting substrate member, an intermediate layer, and a photoconductive layer. The intermediate layer contains a powder of fine particles of tin oxide containing phosphorus. Also disclosed is an electrophotographic apparatus employing the photosensitive member. The fine particles of tin oxide containing phosphorus are a solid solution in which phosphorous atoms are introduced into a crystal lattice of tin oxide. The electrical resistance of the fine particles of tin oxide containing phosphorus is lower than that of fine particles of tin oxide which contain no phosphorus.

U.S. Pat. No. 4,150,986, to Takahata et al., issued Apr. 24, 1979, discloses electrophotographic photosensitive materials having excellent electrophotographic properties and high whiteness wherein titanium dioxide containing a small amount of Li, Zn, Mg, Ca or Ba dopant in its crystal structure is used as electrophotographic photosensitive powder.

U.S. Pat. No. 4,113,658, to Geus, issued Sep. 12, 1978, discloses a process for depositing by precipitation from aqueous solution a metal or metal compound on the surfaces of support particles resulting in catalytic and magnetic materials, for example, iron oxide dispersed on silica or a mixed cobalt-nickel alloy on silica. The deposited metal or metal compound is obtained in the form of a thin layer or in the form of discrete particles, and in either form is substantially homogeneously distributed over the surface, and is further either crystallographically or electrostatically adhered to the support particles.

U.S. Pat. No. 4,280,918 to Homola et al., issued Jul. 28, 1981, discloses a magnetic dispersion prepared by adjusting the pH of a mixture containing magnetic particles to a value which results in a positive electrostatic charge on the particles, while a mixture containing colloidal silica particles at the same pH results in negative electrostatic charges on the silica particles. Combining these mixtures causes the silica particles to coat and irreversibly bond to the magnetic particles resulting in better dispersion and less aggregation of the magnetic particles.

U.S. Pat. No. 5,039,559 to Sang et al., issued Aug. 13, 1991, discloses magnetically attractable particles comprised of a core of magnetic material encapsulated in a metal oxide coating, which can be made by emulsifying an aqueous solution or dispersion of the magnetic material or precursor, and an aqueous solution or sol of a coating inorganic oxide or precursor, in an inert water-immiscible liquid. The aqueous droplets are gelled, for example, by ammonia or an amine, recovered, and heated at 250°–2,000° C. The resulting particles are generally smooth spheres below 100 microns in diameter and often of sub-micron size.

Other references of interest disclose the use of conductive fillers as an intermediate charge layer and include: a conductive metal apparently as a ground-plane and which ground plane layer and related structures are essentially inaccessible to, and ineffective in contact charging schemes, reference Japanese Patent Laid-Open No. sho 58-181054; a conductive metal oxide filler, reference Japanese Patent Laid-Open No. sho 54-151843; and a conductive metal nitride filler, reference Japanese Patent Laid-Open No. hei 111884858; and which devices are known to be highly dependent on changes in the ambient environment, such as temperature or humidity.

The disclosures of each the above patents and references are incorporated herein by reference in their entirety.

There remains a need for imaging processes which employ contact charging methodologies which do not require the use of superimposed alternating voltages or of liquid film layers such as water, alcohol, or the like, and are free of the problems and disadvantages associated therewith.

There is also a need for imaging processes which employ contact charging methodologies which do not require corona generation and associated air breakdown phenomena and the problems and disadvantages associated therewith.

SUMMARY OF THE INVENTION

It is an object, in embodiments, of the present invention to overcome the problems and deficiencies of prior art imaging members, and imaging processes which employ contact charging.

In another object of the present invention, in embodiments, there is provided an imaging member having on its image-forming surface layer comprising substantially isolated, dispersed electrically conductive particles or patches within an electrically insulating surface material matrix.

In still another object of the present invention, in embodiments, there is provided an imaging member comprised of a supporting substrate with a coating thereover and wherein the coating is comprised of resin, electrically conductive metal oxide particles, and insulative metal oxide particles, wherein each electrically conductive particle is substantially electrically isolated and separated from any other of the electrically conductive particles by the insulative particles.

In another object of the present invention, in embodiments, there is provided an imaging member comprised of a supporting substrate with a coating thereover comprised of at least one resin, at least one conductive particulate material, and at least one non conductive particulate material, wherein the conductive particulate material is substantially surrounded, coated, or encapsulated, by the non conductive particulate material.

In still another object of the present invention, in embodiments, there is provided an imaging member comprised of: a supporting substrate with a coating thereover comprised of a resin, electrically conductive metal oxide particles, and insulating metal oxide particles, wherein the electrically conductive particles are substantially electrically isolated from other like conductive particles by the insulating particles, and the isolated electrically conductive particles are substantially uniformly dispersed in the resin.

In yet another object of the present invention, in embodiments, there is provided an electrophotographic apparatus comprising, for example, any of the aforementioned imaging members; an image exposure member for exposing and selectively discharging the charged imaging member to form a latent image thereon; and a developer housing for developing the latent image formed on the imaging member with toner particles.

These and other objects of the present invention are accomplished, in embodiments, by providing an imaging member comprised of a supporting substrate with a coating thereover comprised of at least one resin, at least one conductive particulate material, and at least one non conductive particulate material, wherein the conductive particulates are substantially isolated from each other by the non conductive particulate material and the resin.

Advantages of the present invention, in embodiments, include, providing an imaging member which is capable of being contact charged without liquids or superposed alternating voltages, and the without problems associated therewith, and possessing other useful properties as illustrated herein.

DETAILED DESCRIPTION OF THE INVENTION

The present invention provides, in embodiments, an imaging member having on the outer most or image-forming surface, a layer comprising contact charge accessible, isolated, electrically conductive particles or islands which are substantially uniformly dispersed within an electrically insulating surface material matrix.

Also provided in the present invention, in embodiments, is an imaging member comprised of a supporting substrate with a coating thereover comprised of resin, electrically conductive metal oxide particles, and insulative metal oxide particles, wherein the electrically conductive particles are substantially isolated or separated from like conductive particles by the insulative particles, and wherein the isolated electrically conductive particles are substantially uniformly dispersed in the resin.

Also provided in the present invention, in embodiments, is an imaging member comprised of a supporting substrate with a coating thereover comprised of at least one resin, and preferably from 1 to about 3 resin components, at least one conductive particulate material, and preferably from 1 to about 3 conductive particulate components, and at least one non conductive particulate material, and preferably from 1 to about 3 non conductive or insulative particulate components, wherein the conductive particulate material is substantially surrounded by the non conductive particulate material.

The imaging members and imaging processes thereof of the present invention possess unique imaging properties attributable to: the charge receptive nature of the conductive patches; their small dimensions, which are smaller than the smallest visible image feature, for example, of about $10^4$ nanometers; and to their isolation from each other. The isolation of the conductive metal oxide particles is achieved, in embodiments, by surrounding the conductive particles of submicron dimension with at least one surface layer of non conductive metal oxide particles of comparable or smaller submicron dimensions, so that the conductive particles are physically separated from one another by one or more intervening non-conductive metal oxide particles. The conductive particles with a non conductive particle dilution or surface coating, are thereafter dispersed in a suitable resinous binder matrix and the mixture applied to form a charge-receptive surface on the image forming face of the imaging member. The aforementioned conductive particles having non conductive particles bound or associated with the surface thereof can be prepared by a variety of known methods and as illustrated herein.

In embodiments, the isolated electrically conductive particles can be substantially uniformly dispersed in the resin and which dispersion and coating of the dispersion onto a suitable supporting substrate can be accomplished by conventional methods.

In embodiments, the aforementioned electrically conductive particles having non conductive particles bound or associated with the surface thereof can be deposited or impregnated into, for example, as an aerosol, onto a receptive surface layer, for example, a moderately viscous resin material or resin solution or dispersion, and thereafter cured or hardened by conventional methods such as, solvent evaporation and drying, and thermal or photochemical cross linking.

Coating of the mixture of conductive and insulating particles in a resin is accomplished, for example, by selecting a suitable solvent which will enable a uniform dispersion of the particulate material in the resin, a uniform coating of the mixture onto the substrate, and rapid and convenient removal of the solvent. Suitable solvents include resin compatible or soluble solvents such as glycol ethers, tetrahydrofuran, acetonitrile, pyrrolidone, and the like solvents, and mixtures thereof. The thickness of the resulting coating is, for example, from about 0.1 to about 10 microns.

A uniform coating refers, in embodiments, to evenness of the coating layer thickness across the supporting substrate and to an even distribution of the isolated electrically conductive particles within the coating layer and wherein the conductive particles are substantially all separated from one another or adjacent conductive particles by one or more non-conductive metal oxide particles.

The resulting imaging member preferably has a lateral charge conductivity of about zero, and is chargeable by contacting with a biased charging member such as a blade, a roll, a brush, and the like, and combinations thereof. The biased charging member, in embodiments, is conductive or semiconductive.

The conductive patches can have particles of a conductive metal oxide particulate, for example, tin oxide, tin oxide doped with indium oxide, doped zinc oxide, doped titanium oxide, and mixtures thereof.

The conductive metal oxide particles can also include minor amounts, for example, from about 0.1 to about 20 percent based on the volume of the coating, of other useful additives or dopants, such as Li, Zn, Mg, Ca, Ba, P, oxides thereof, salts thereof, and the like, and mixtures thereof, which can favorably alter the conductivity, either positively or negatively; charging; imaging; or environmental properties of the resulting imaging member. In embodiments, a preferred electrically conductive particle is tin oxide.

In embodiments, the electrically conductive particles can have a volume average particle size diameter of from about 10 to about 10,000 nanometers, and the insulative particles can have a volume average particle size diameter comparable to or smaller than the conductive particles, such as of from about 10 to about 10,000 nanometers. The resistivity of the electrically conductive particles, measured as a compressed pellet, can be in embodiments, for example, from about 0.1 to about $10^5$ ohm centimeters The amount of conductive particles present in the imaging member coating layer should be as large as possible and up to that value which permits charge percolation or transfer between or among the conductive particles, for example, from about 30 to 90 percent of the electrical percolation limit. Typically this is from about 10 to about 30 volume percent based on the combined volume of the resin and the dispersed particulates.

In embodiments of the present invention, the charge accepting overcoating can further include a photogenerating material, such as known photogenerating materials disclosed in the aforementioned commonly owned U.S. Pat. No. 5,013,624, the disclosure of which is incorporated by reference herein in its entirety, to render the resulting imaging member both charge accepting and photogenerating.

The insulative particles can be, in embodiments, for example, fumed silicas, substantially undoped zinc oxide, and undoped titanium dioxide, and mixtures thereof, with pellet resistivity properties greater than or equal to about $10^{12}$ ohm centimeters. In embodiments, preferred insulative particles are fumed silicas, for example, as available from DeGussa Corp. The insulative particles can further include surface or internal additives which render the particles more effective, for example, during the application to the surface of the conductive particles to improve adhesion thereto, during the imaging member fabrication layer coating step to enhance or control dispersibility of the particulate phase, or as charge insulators or suppressors in the resulting imaging member. Examples of additives include charge control additives known in the field of electrophotographic developers, and hydrophobic surface treatments, such as found in certain AEROSIL® products available from DeGussa. The amount of additional dopants or additives can be in amounts of from about 0.01 to about 10 weight percent of the conductive metal oxide particle material selected.

The binder resin selected may be a xerographically insulating material, and can be for example, in embodiments, a phenolic resin, a polyurethane, a polyamide, a polyimide, a polyamide-imide, a polyamide acid, a polyvinyl acetal, an epoxy resin, an acrylic resin, a melamine resin, a polycarbonate, a polyether carbonate, a polyester, and the like resins, and mixtures thereof. A preferred binder is an acrylic resin. The binder resin selected may also be a xerographic charge transporting composition, for example, aryl amine compounds, as illustrated in U.S. Pat. No. 4,265,990, and dispersed in an inactive resin binder, as disclosed for example, in commonly owned and assigned U.S. Pat. No. 5,013,624, col. 6–7, the disclosures of the aforementioned U.S. patents are incorporated herein by reference in their entirety. From about 10 to about 90 percent, and more preferably from about 25 to about 75 weight percent of the binder resin can be selected. In the absence of injected charges, achieved for example by illuminating photogenerating pigments, such charge transporting compositions are effectively insulators. In embodiments, a preferred resin is one that is also highly optically transparent.

The substrate is selected so that charges near its imaging top or outer most surface create developable electric fields extending beyond the top surface and into a development zone. The thickness of the substrate layer is dependent on many factors, such as the flexibility or rigidity desired. In embodiments, the substrate is generally from about 10 to about 500 microns in thickness. Thicknesses of from about 25 micrometers to about 200 micrometers may be selected when flexible substrates are desired, and preferably from about 40 microns in thickness from a ground plane to the outer most or top surface. The substrate may be opaque or transparent, and may comprise numerous suitable materials having the required mechanical properties. Accordingly, the substrate may comprise a layer of an electrically non-conductive or conductive material such as an inorganic or organic composition. As electrically non-conductive materials there may be employed various resins known for this purpose including polyesters, polycarbonates, polyamides, polyurethanes, and the like. The electrically insulating or conductive substrates can be flexible and may have any number of different configurations such as, for example, a sheet, a scroll, an endless flexible belt, and the like. Preferably, the substrate is in the form of an endless flexible belt and comprises a commercially available biaxially oriented polyester known as MYLAR™, available for E. I. du Pont de Nemours & Co., or MELINEX, available from Hoechst Corporation.

In embodiments of the present invention there is provided an electrophotographic apparatus comprising: an imaging member comprised of a supporting substrate with a coating thereover and wherein the coating is comprised of resin, electrically conductive metal oxide particles, and insulative metal oxide particles, wherein each electrically conductive particle is substantially electrically isolated and separated from any other of the electrically conductive particles by said insulative particles; a contact charging member for charging the imaging member; an image exposure member for exposing and electrically discharging the resulting charged imaging member to form a latent image thereon; and a developer housing with toner therein, wherein the latent image is developed with said toner. After creation of the electrostatic charge image on the surface thereof, the imaging member will behave substantially as an insulator so the electrostatic image does not readily decay. Where an electroreceptor is desired, the substrate may be any mechanically suitable insulator such as MYLAR™ polyester film, polycarbonate film, acrylic, and the like. Where a photoreceptor is desired, the substrate material can be any suitable charge-transporting materials known to one of ordinary skill in the art, reference the aforementioned U.S. Pat. No. 5,013,624, such as, for example a 1:1 ratio or copolymer combination of an aryl amine compound and a polycarbonate.

The present invention will further be illustrated in the following non limiting Examples, it being understood that these Examples are intended to be illustrative only and that the invention is not intended to be limited to the materials, conditions, process parameters, and the like, recited herein. Parts and percentages are by weight unless otherwise indicated.

EXAMPLE I

Preparation of Contact Charging Overcoated Imaging Member

The following mixture was prepared:

| | |
|---|---|
| Tin Oxide Particles | 1.0 gram |
| Fumed Silica (DeGussa, R812) | 1.2 gram |
| Acrylic Resin (Dupont, Elvacite 2008) | 0.40 gram |
| Methyl Ethyl Ketone | about 30 mL |

The tin oxide particles were prepared by vapor phase flame technology in accordance with the aforementioned commonly owned and assigned U.S. Pat. No. 5,424,129, the disclosure of which is incorporated herein by reference in its entirety. The resistivity of the resulting particles, measured as a compressed pellet, was about 200 ohm centimeters, and a primary particle size was about 10 nanometers. These particles were post-treated with hexamethyl disilazane to create a conventional hydrophobic, organic-compatible surface. The surface treated fumed silica particles selected as the insulating metal oxide particles were hydrophobic, xerographically insulating, having a pellet resistivity believed to be in excess of $10^{12}$ ohm centimeters, and a primary particle size was about 10 nanometers. Mixture proportions were computed to yield a volume fraction of tin oxide to other solids of about 20 percent, which is under the percolation limit for charge transfer for roughly spherical particles. Millimeter size glass balls were added and the mixture homogenized on a paint shaker for about 1 hour to produce a coating mixture.

A MYLAR™ film about 50 microns thick having an aluminum coating on one side was used as the basis for an electroreceptor, the aluminum coating serving as ground plane. The coating mixture was spin-coated onto the unaluminized face of the MYLAR film to yield, after drying, an oxide-laden surface layer about 0.5 microns thick.

A charging member was provided as a piece of square-cut, carbon-loaded silicone elastomer blade about 2 millimeters thick and 1 centimeter wide which could be electrically biased and drawn across a surface to be charged. The blade material had a resistivity of about $5\times10^4$ ohm centimeters.

The imaging member was taped to an aluminum plate, overlapping a comparison, uncoated MYLAR™ film taped next to it. The charging blade, biased to +700 volts, was drawn smoothly at about one inch per second across the faces of both films charging them in a single operation. Finally, the resulting charged images were made visible by simultaneous powder cloud development using, for example, a mixture of two DAYGLO® pigmented colorants aerosolized by feeding through an aspirator and which development procedure is known in the art, for example, in the development of Lichtenberg figures. This development method is described, for example, in *High Sensitivity Electrophotographic Development*, R. B. Lewis and H. M. Stark, in *Current Problems in Electrophotography*, deGruyter, Berlin, 1972, the disclosure of which is incorporated by reference herein in its entirety, where it is shown to be a sensitive probe of the details of electrostatic images.

On the aforementioned electroreceptor having the mixed oxide overcoating the developed image as determined by visual observation was more dense and of smoother texture than the developed image on the unmodified MYLAR™. Also, on the modified electroreceptor, the edges of the image, left by the ends of the biased blade, were sharply defined, showing that the charge pattern had not spread laterally.

EXAMPLE II

Contact Charging and Photogenerating Overcoated Imaging Member

Example I is repeated with the exceptions that: 1) photogenerating pigments are substituted for some or all of the insulating oxide particles; 2) the conductive particles are selected to be non charge injecting into the photoreceptor charge transport material; 3) the binder resin is charge transporting; and 4) a layer of photoreceptor charge transporting material, for example, a 1:1 mol ratio of an arylamine charge transporting compound, for example, as disclosed in the aforementioned commonly owned U.S. Pat. No. 5,013,624, and LEXAN polycarbonate resin, be substituted for the body of the MYLAR™ film.

The above mentioned patents and publications are incorporated by reference herein in their entirety.

Other embodiments and modifications of the present invention may occur to one of ordinary skill in the art subsequent to a review of the information presented herein; these embodiments and modifications, as well as equivalents thereof, are also included within the scope of this invention.

What is claimed is:

1. An electrostatic imaging member comprised of a supporting substrate with a coating thereover, wherein the coating is comprised of resin, electrically conductive metal oxide particles, and electrically insulative metal oxide particles, wherein each electrically conductive metal oxide particle is electrically isolated and separated from any other of the electrically conductive metal oxide particles and wherein the electrically insulative metal oxide particles reside on the surface of the electrically conductive metal oxide particles.

2. An imaging member in accordance with claim 1 wherein the electrically conductive metal oxide particles are uniformly dispersed in the resin.

3. An imaging member in accordance with claim 1 wherein the electrically conductive metal oxide particles have a volume average particle size diameter of from about 10 to about 10,000 nanometers.

4. An imaging member in accordance with claim 1 wherein the electrically insulative metal oxide particles have a volume average particle size diameter less than or equal to the particle size of the electrically conductive metal oxide particles.

5. An imaging member in accordance with claim 1 wherein the coating is of a thickness of from about 0.1 to about 5 microns.

6. An imaging member in accordance with claim 1 wherein the electrically isolated electrically conductive metal oxide particles are separated from one another by said resin.

7. An imaging member in accordance with claim 1 wherein the resin is optically transparent.

8. An imaging member in accordance with claim 1 wherein the imaging member is chargeable by contacting with a biased charging member selected from the group consisting of a blade, a roll, a brush, and combinations thereof.

9. An imaging member in accordance with claim 1 wherein the imaging member has a lateral charge conductivity of zero.

10. An imaging member in accordance with claim 1 wherein the electrically conductive metal oxide particles are tin oxide.

11. An imaging member in accordance with claim 1 wherein the electrically conductive metal oxide particle is tin oxide.

12. An imaging member in accordance with claim 11 wherein the tin oxide particles contain a conductive dopant material.

13. An imaging member in accordance with claim 1 wherein the electrically conductive metal oxide particles are selected from the group consisting of doped indium oxide, doped zinc oxide, doped titanium oxide, and mixtures thereof.

14. An imaging member in accordance with claim 13 wherein the doped metal oxide particles are doped with a dopant selected from the group consisting of Li, Zn, Mg, Ca, Ba, P, and mixtures thereof.

15. An imaging member in accordance with claim 1 wherein the insulative metal oxide particles are selected from the group consisting of fumed silica, undoped zinc oxide, undoped titanium dioxide, and mixtures thereof.

16. An imaging member in accordance with claim 1 wherein the resin is substantially electrically insulating and which resin is selected from the group consisting of phenolics, polyurethanes, polyamides, polyimides, polyamide-imides, polyamide acids, polyvinyl acetals, epoxy resins, acrylics, melamine resins, polycarbonates, polyether carbonates, polyesters, and mixtures thereof.

17. An imaging member in accordance with claim 1 wherein the resin is an acrylic.

18. An imaging member in accordance with claim 1 wherein the resin is present in an amount of from about 10 to about 90 weight percent of the coating layer.

19. An imaging member in accordance with claim 1 wherein the resin is a photoreceptor charge transport material.

20. An imaging member in accordance with claim 1 wherein the substrate is a flexible polymer.

21. An imaging member in accordance with claim 1 wherein the amount of electrically conductive metal oxide particles present in the coating is from about 30 to 90 percent of the electrical percolation threshold.

22. An imaging member in accordance with claim 1 further comprising incorporating a photogenerating material within the overcoating to render the resulting imaging member charge accepting and photogenerating.

23. An imaging member in accordance with claim 1 wherein the coating is charge accepting.

24. An electrophotographic apparatus comprising: the imaging member of claim 1 wherein the coating further contains a photogenerating material; a contact charging member for charging the imaging member; an image exposure member for exposing and electrically discharging the resulting charged imaging member to form a latent image thereon; and a developer housing with toner therein, wherein the latent image is developed with said toner.

25. An electrostatic imaging member comprised of a supporting substrate with a coating thereover, wherein the coating is comprised of resin, electrically conductive metal oxide particles, and electrically insulative metal oxide particles, wherein each electrically conductive metal oxide particle is electrically isolated and separated from any other of the electrically conductive metal oxide particles by the electrically insulative metal oxide particles wherein the insulative particles are silica.

26. An electrostatic imaging member comprised of a supporting substrate with a coating thereover, wherein the outer surface of the coating is an image-forming surface comprised of isolated, contact charge accessible, electrically conductive metal oxide patches dispersed in an electrically insulating material, wherein the isolated, contact charge accessible, electrically conductive metal oxide patches comprise at least one conductive metal oxide particulate material, and at least one non conductive metal oxide particulate material, and wherein said at least one non conductive metal oxide particulate material resides on the surface of said at least one conductive metal oxide particulate material.

* * * * *